(12) United States Patent
Gossett (10) Patent No.: US 8,923,364 B1
(45) Date of Patent: Dec. 30, 2014

(54) TRANSMITTING DATA OVER DISCONTIGUOUS PORTIONS OF RADIO FREQUENCY SPECTRUM

(71) Applicant: Google Inc., Mountain View, CA (US)

(72) Inventor: C. Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/800,006

(22) Filed: Mar. 13, 2013

(51) Int. Cl.
*H04B 1/00* (2006.01)
*H04B 1/707* (2011.01)

(52) U.S. Cl.
CPC ..................... *H04B 1/707* (2013.01)
USPC ........... 375/146; 375/130; 375/267; 375/141; 375/140; 375/299; 375/135; 375/347; 375/E1.002; 455/522; 455/323; 455/102; 455/103; 455/303; 455/101; 455/91; 455/307; 455/500; 370/329; 370/252; 370/328; 370/342; 370/280; 370/480; 370/345; 370/336

(58) Field of Classification Search
CPC ... H04L 5/0037; H04L 5/0039; H04L 5/0041; H04L 5/0082; H04L 27/0012; H04L 27/2601; H04L 69/14; H04L 27/04; H04B 1/707; H04B 7/068; H04B 7/12; H04B 1/69; H04W 16/12; H04W 16/14; H04W 72/0453
USPC ......... 375/146, 267, 295, 140, 260, 299, 135, 375/347, 141, 133, 130, E1.002; 455/454, 455/101, 500, 91, 323, 103, 102, 303, 307, 455/522; 370/329, 328, 252, 312, 320, 342, 370/345, 441.48, 336, 319, 280, 458, 480
See application file for complete search history.

(56) References Cited

U.S. PATENT DOCUMENTS

| | | |
|---|---|---|
| 4,655,228 A | 4/1987 | Shimura et al. |
| 5,142,692 A | 8/1992 | Owen |
| 5,757,865 A | 5/1998 | Kaku et al. |
| 5,809,453 A | 9/1998 | Hunt |
| 5,930,299 A | 7/1999 | Vannatta et al. |
| 6,850,735 B2 | 2/2005 | Sugar et al. |
| 6,987,815 B2 | 1/2006 | Denno |

(Continued)

OTHER PUBLICATIONS

Haykin, "Cognitive Radio: Brian-Empowered Wireless Communications." Feb. 2005, IEEE Journal on Selected Areas in Communications, 23(2):201-220.

(Continued)

*Primary Examiner* — Rahel Guarino
(74) *Attorney, Agent, or Firm* — Fish & Richardson P.C.

(57) ABSTRACT

In general, the subject matter described in this disclosure can be embodied in methods, systems, and program products for transmitting data over discontiguous portions of radio frequency spectrum. Data that is to be wirelessly transmitted to a remote computing device is received. A first signal that encodes the data across a band of radio frequencies is generated. The first signal is split into multiple signals, each of the multiple signals being associated with a different portion of the band of radio frequencies. Each of the multiple signals is filtered to isolate each respective one of the multiple signals to its associated portion of the band of radio frequencies. At least one of the multiple signals is frequency translated. Each of the multiple signals are combined after the filtering of each of the multiple signals. The second signal is provided for wireless transmission by an antenna.

18 Claims, 5 Drawing Sheets

(56) References Cited

U.S. PATENT DOCUMENTS

| | | | |
|---|---|---|---|
| 7,149,239 | B2 | 12/2006 | Hudson |
| 7,203,472 | B2 | 4/2007 | Seppinen et al. |
| 7,397,840 | B1 | 7/2008 | Lillo |
| 8,259,830 | B1 * | 9/2012 | McCloskey et al. ........... 375/260 |
| 8,494,457 | B2 * | 7/2013 | Zheng ............................ 455/77 |
| 2003/0198304 | A1 | 10/2003 | Sugar et al. |
| 2004/0028123 | A1 | 2/2004 | Sugar et al. |
| 2004/0047324 | A1 | 3/2004 | Diener |
| 2006/0256884 | A1 | 11/2006 | Tomioka et al. |
| 2007/0001754 | A1 | 1/2007 | Lakdawala et al. |
| 2007/0142089 | A1 | 6/2007 | Roy |
| 2007/0223608 | A1 | 9/2007 | Nakayama et al. |
| 2008/0227409 | A1 | 9/2008 | Chang et al. |
| 2008/0268892 | A1 | 10/2008 | Hamdi et al. |
| 2009/0041087 | A1 | 2/2009 | Yamasuge |
| 2009/0257471 | A1 | 10/2009 | Tanaka et al. |
| 2010/0118921 | A1 | 5/2010 | Abdelmonem et al. |
| 2011/0011888 | A2 | 1/2011 | White |
| 2011/0163900 | A1 | 7/2011 | Pagnanelli |

OTHER PUBLICATIONS

'Internet.com-Webopedia' [online]. "What is Channel Bonding?—A Word Definition From the Webopedia . . . ," 2002, [retrieved on Sep. 7, 2010]. Retrieved from the internet: <URL: http://www.webopedia.com/TERM/C/channel_bonding.html. 3 pages.

Jack et al., "Real Time Cepstrum Analysis Based on Saw Devices." Microwave Symposium Digest, 1997 IEEE MTT-S International, 324-327.

"Linear Technology." Linear Technology Corporation, 2006, 28 pages.

Min and Samueli. "Analysis and Design of a Frequency-Hopped Spread-Spectrum Transceiver for Wireless Personal Communications," IEEE Transactions on Vehicular Technology, 49(5):1719-1731, Sep. 2000.

Nyquist, "Certain Topics in Telegraph Transmission Theory," Proceedings of the IEEE, 90(2):280-305, Feb. 2002.

Unlicensed Operation in the TV Broadcast Bands vs. Additional Spectrum for Unlicensed Devices Below 900 MHz and in the 3 GHz Band. Second Report and Order and Memorandum Opinion and Order, Before the Federal Communications Commission, Washington, D.C. 20554. Federal Communications Commission, FCC 08-260, Nov. 14, 2008, 130 pages.

* cited by examiner

TRANSMITTING DATA OVER DISCONTIGUOUS PORTIONS OF RADIO FREQUENCY SPECTRUM

TECHNICAL FIELD

This document generally relates to wireless communication.

BACKGROUND

In telecommunications, specific frequencies or ranges of frequencies can be allocated for use by broadcasting services in different geographical areas. Such ranges of frequencies are often allocated by international agreement or a governing body. For example, the television channel 2 in North America references the broadcast band of frequencies between 54 and 60 MHz.

The electromagnetic spectrum that mobile computing devices use for wireless communication is treated as a limited resource. Governments control where in the spectrum particular wireless technologies can operate, and also control what entities can use particular portions of the spectrum (e.g., through high-cost spectrum auctions). Because a particular entity will thus have limited spectrum and will have paid a large amount for it, various mechanisms are used to maximize the data that a network of mobile computing devices and corresponding base stations can exchange in a particular portion of spectrum.

Some frequency ranges are not allocated by governments to a specific entity, and can be used by the public or designated entities as long as no other transmissions are being broadcast over the frequency ranges by other devices. Similarly, some frequency ranges are assigned to specific entities, but are not in use at a particular location. For example, frequencies that are assigned to an otherwise active radio frequency channel may not serve to transmit data, but may serve as a guard band between other channels. These inactive radio frequency ranges can be made available for use by communication devices. As such, some frequencies or bands of frequencies are not being used at a particular location, or have recently become available for use as broadcasters that have switched from analog transmissions to digital transmissions.

Spatial division multiple access (SDMA) is a mechanism that is used to increase the amount of data exchanged in a wireless network. In SDMA systems, users are multiplexed in the spatial domain so that multiple users can broadcast and receive from different spatial degrees of freedom. For example, several mobile computing devices can communicate with the same base station at the same time and over the same band of frequencies if the devices are geographically separated (i.e., if the devices are located in different spatial degrees of freedom). As one example, two simultaneously-communicating devices may be located on opposite sides of a broadcast and reception tower of a base station. SDMA can be achieved in a network by using an array of antennas that can adapt signals that radiate from a base station in the direction of a client device (e.g., using transmit and receive beamformers). Additionally, an SDMA system can be configured and deployed for time division multiple access (TDMA), by which multiple client devices that are geographically located near each other can share the same spatial-frequency resource by having each device transmit or receive only during certain slices of time that are coordinated with each other.

Modern wireless data communication systems provide bandwidth for use by rich computing applications on mobile devices. For example, users of wireless devices such as smart phones can make telephone calls, receive emails, and even receive full motion audio/video broadcasts on their mobile devices. Every time a great new service is offered, users of wireless devices consume data associated with the service, requiring more and more bandwidth. As a result, the airwaves are filled with data going to and from an increasing number of wireless computing devices that each require growing amounts of data.

SUMMARY

This document describes wireless transmission of data over discontiguous portions of radio frequency spectrum. In general, a wireless communication system may transmit, over multiple discontiguous ranges of radio frequency spectrum, a signal that encodes a single stream of data. As an illustration, an organization may operate a wireless communications system that is designed to transmit a signal across a wide band of frequencies at a lower power level (e.g., at a power level beneath the noise level). As discussed below, many benefits can result from certain implementations of such a wideband, low-power wireless transmission system, such as reduced noise between spatial degrees of freedom and reduced system noise, as perceived by third-party devices that are not a part of the wireless communication system.

A drawback to such a wideband transmission system is historically the difficulty in obtaining, or the cost to obtain, access to a range of radio frequencies that is wide enough to permit the benefits of such a transmission scheme. An organization may not be able to purchase or otherwise obtain permission to transmit over a single swath of radio frequencies of the desired breadth. Such bands may not exist, or may be cost prohibitive for an organization. The system discussed throughout this document, however, enables the use of such a wideband transmission scheme by splitting the wideband signal among multiple discontiguous portions of radio frequency spectrum. As such, the organization may purchase multiple distinct and narrower bands of radio frequencies that, when combined, provide the necessary bandwidth for the described wideband transmission scheme.

To use the wideband transmission scheme with multiple discontiguous bands of radio frequency spectrum, a transmission system may generate the wideband signal and, instead of simply transmitting the wide band signal at frequency, may perform various actions to separate the wideband signal into separate portions of frequency content for transmission over discontiguous bands of radio frequency spectrum. For example, the transmission system may split the wideband signal into multiple distinct signals, and may isolate each of the multiple signals to separate bands of radio frequencies.

The transmission system may shift the isolated bands of radio frequency content in frequency, and may thereafter sum the signals together. The summed signal may be frequency translated from baseband to an appropriate frequency for wireless transmission, and may be provided to an antenna as a single, continuous, analog signal. The single analog signal may be formed without the system channel hopping between different analog signals. Moreover, the single analog signal may encode data that is designated for transmission to a single remote computing device, despite the single analog signal having frequency content at only specified, discontiguous frequency ranges. As such, the transmission system basically transmits ranges of frequency content in a wideband signal over different frequency ranges, because the wideband signal itself is too wide for any single available frequency range that the organization is permitted to use.

In an analogous manner, the wireless communication system may receive data over multiple radio frequency channels. For example, a front-end analog receiver may receive wireless energy over a broad range of frequencies and translate the signal to baseband. The baseband signal may be split into multiple separate signals, and each signal may be filtered to isolate a different band of frequencies. The band of frequencies in each signal may be translated in frequency, and the multiple signals may be summed after the filtering and frequency translation to generate a wideband signal that does not include any discontiguous portions and is a representation of the wideband signal that was initially generated by the transmitting device. The wideband signal may be converted from analog to digital, and decoded with a de-spreading operation to extract a digital stream of data (e.g., the digital stream of data that was initially received for transmission at the transmitting device).

As additional description to the embodiments described below, the present disclosure describes the following embodiments.

Embodiment 1 is a method for transmitting data over discontiguous portions of radio frequency spectrum. The method comprises receiving data that is to be wirelessly transmitted to a remote computing device. The method comprises generating a first signal that encodes the data across a band of radio frequencies. The method comprises splitting the first signal into multiple signals, each of the multiple signals being associated with a different portion of the band of radio frequencies. The method comprises filtering each of the multiple signals to isolate each respective one of the multiple signals to its associated portion of the band of radio frequencies. The method comprises frequency translating at least one of the multiple signals. The method comprises combining each of the multiple signals after the filtering of each of the multiple signals, including the at least one of the multiple signals that has also been frequency translated, to generate a second signal that encodes the data across multiple discontiguous bands of radio frequencies. The method comprises providing the second signal for wireless transmission by an antenna.

Embodiment 2 is the method of embodiment 1. The data that is to be wirelessly transmitted to the remote computing device is a stream of digital data. Generating the first signal includes combining the stream of digital data with a pseudo-random sequence of data that encodes the pseudorandom sequence of data with a highest frequency that is higher than a highest frequency of the stream of digital data.

Embodiment 3 is the method of any one of embodiments 1 and 2, wherein generating the first signal includes using direct sequence spread spectrum (DSSS) techniques to encode the first signal across the band of radio frequencies.

Embodiment 4 is the method of any one of embodiments 1 through 3, wherein: the multiple signals includes at least three signals; and frequency translating the at least one of the multiple signals includes frequency translating each of the multiple signals.

Embodiment 5 is the method of any one of embodiments 1 through 4, wherein frequency translating the at least one of the multiple signals includes using a first mixer to frequency translate the at least one of the multiple signals, and a second mixer to frequency translate another one of the multiple signals, and wherein a local oscillator that is applied to the first mixer is different than a local oscillator that is applied to the second mixer.

Embodiment 6 is the method of any one of embodiments 1 through 5, wherein frequency translating at least one of the multiple signals includes translating a frequency of the at least one of the multiple signals a different amount than another of the multiple signals.

Embodiment 7 is the method of any one of embodiments 1 through 6, further comprising digitally filtering the at least one of the multiple signals to: reduce a power level of certain frequencies within the portion of the band of radio frequencies that is associated with the at least one of the multiple signals, and generate multiple discontiguous portions within the portion of the band of radio frequencies that is associated with the at least one of the multiple signals.

Embodiment 8 is the method of any one of embodiments 1 through 7, further comprising upconverting the second signal or each of the multiple signals from baseband to a higher frequency range.

Embodiment 9 is the method of any one of embodiments 1 through 8, wherein frequency content of the discontiguous bands of radio frequencies in the second signal includes all frequency content of the first signal.

Embodiment 10 is the method of any one of embodiments 1 through 9, wherein filtering each of the multiple signals to isolate each respective one of the multiple signals includes reducing a power level of each respective signal at frequencies that do not correspond to the portion of the band of radio frequencies that is associated with each respective one of the multiple signals.

Other implementations include one or more computer-readable storage devices storing instructions that, when executed by one or more processing devices, cause performance of operations according to the above-described methods. Other implementations include systems and apparatus that include the described one or more computer-readable storage devices and that are configured to execute the operations using one or more processing devices.

Particular embodiments can be implemented, in certain instances, to realize one or more of the following advantages. Use of a wideband transmission scheme may allow the system to operate at a low power level, reducing noise between spatial degrees of freedom and system noise, as seen by third-party devices. The system may use discontiguous portions of radio spectrum that would otherwise be unused or underutilized. Thus, unused wireless spectrum may aid wireless communication with mobile devices instead of lying dormant. A wideband system may be implemented at lower total cost than a system that required purchase of a single large band of radio frequency spectrum.

The details of one or more embodiments are set forth in the accompanying drawings and the description below. Other features, objects, and advantages will be apparent from the description and drawings, and from the claims.

DETAILED DESCRIPTION

This document describes transmission of data over discontiguous portions of radio frequency spectrum. In general, this document describes a system that is capable of transmitting a wireless signal from one device to another device across discontiguous bands of radio frequency spectrum. As such, the system realizes benefits of wideband signal transmission, even though a single contiguous band of frequency spectrum that is of appropriate width may not be available to support transmission of the wideband signal.

A single base station employing the described wireless communication system may be used to provide a large number of wireless computing devices at one time (e.g., 10,000 devices) with wireless internet connectivity. Thus, a geographically dispersed network of fifty base stations may serve users of an entire metropolitan area. Numerous features of the system enable network access by such a large number of computing devices. The communication system may use time division multiple access (TDMA) to broadcast to separate groups of the wireless computing devices at a particular time.

A single base station may transmit to a particular group of the devices at a particular time over a same frequency band (or collection of discontiguous bands) by using spatial division multiple access (SDMA). In SDMA, a group of mobile devices are multiplexed in the spatial domain so that the group of devices can broadcast to and receive from the base station from different spatial degrees of freedom. Thus, the base station may transmit, during a particular time period and towards a particular spatial region (out of multiple spatial regions to which the base station is simultaneously transmitting), a stream of data for a single mobile computing device that is geographically located in the particular spatial region. A special region may be an angular band of a certain number of degrees of compass direction.

The stream of data may have been encoded across a frequency band using direct sequence spread spectrum (DSSS) techniques. The frequency band over which the stream of data has been encoded, however, may have a width that exceeds that of any available radio frequency bands or channels. As such, the described transmission system may use filters and mixers to move certain portions of the frequency band to specific frequencies ranges that are available. The resulting transmission over the available frequency ranges may be simultaneous. In other words, the transmission may be of a single time-varying signal that includes frequency components for frequencies in each of the available frequency ranges (but doesn't include frequency content of substantial power levels at other frequency ranges). In some examples, frequency components for each of the available frequency bands are found within a single time period of the time-varying signal that is an inverse of the lowest frequency of substantial power level in the band (i.e., a time period of a single cycle of the lowest frequency of substantial power level in the band).

As already mentioned, the frequency ranges that are available and over which the stream of data may include frequency content are discontiguous. In other words, at least two of the available frequency ranges may be non-adjacent due to a presence of a frequency range over which the organization is unable to transmit (e.g., because a third-party organization is provided with permission to transmit at such frequencies). The available discontiguous frequency ranges, if combined, may provide a large swath of bandwidth for transmission of a signal with a relatively wide bandwidth (e.g., a signal with a bandwidth of at least 100 MHz).

The use of a signal with such a wide bandwidth allows for transmission at a reduced power level. Thus, the system may be designed to operate as a low signal-to-interference ratio (SIR) system (e.g., below 0 dbm). A low SIR system can reduce interference to neighboring cells, and thus may be more robust against interference from devices that are under the network's control. Further, use of DSSS techniques across such a wide bandwidth and at such a low SIR ratio may allow system communications to appear as noise to third-party devices.

As an illustration, a base station may have queued separate streams of data for transmission to each of separate mobile computing devices. Using DSSS techniques, a pseudorandom sequence may be multiplied against each stream of data to spread the energy of each original signal, when transmitted by a carrier wave, from a given frequency bandwidth into a wider bandwidth. Using TDMA techniques, a portion of the data streams may be selected for transmission at a given time and another portion of the data streams may be selected for transmission at another time.

The frequency content of each signal may cover a bandwidth that is of a width for which an available block of frequencies is not available. As such, the transmission system may split the signal into many substantially identical signals, and use filters and mixers to shift specific portions of frequency content up or down in frequency to available bands of frequencies. The signals may be combined to form a single stream of data with frequency content at frequencies at which transmission is permitted (e.g., because an entity that manages the transmission system has licensed the frequencies), and without frequencies of substantial energy levels at frequencies at which transmission is not permitted (e.g., because other entities have licensed the frequencies). As such, the transmitted signal may include a substantial reduction in power of at least 72.78 dB between an available band of frequencies and an unavailable band of frequencies, measured through an integration of the full bandwidth of the available band of frequencies and the power measured in the first 100 kHz of the adjacent and unavailable band of frequencies.

Each stream of data that is selected for transmission at a given time to a particular spatial degree of freedom may undergo spatial precoding so that the data stream is transmitted by an array of antennas. The array of antennas may effectively work as a team to create a pattern of constructive and destructive interference in the wavefront to reinforce a signal strength for the data stream in a particular direction and suppress the signal strength in undesired directions. Accordingly, a spatial precoder receives the data stream as an input signal and provides precoded signals to multiple channelizing circuits, one channelizing circuit for each antenna in the array.

The described system can be different than heterodyne systems that channel hop instead of receiving and transmitting over several discontiguous portions of frequency at once. Further, the described system can also be different than systems that perform channel bonding. More specifically, while channel bonding may include using several discrete radios over several discrete channels and bonding the channels together, the described system can use a single radio to generate or access data across a wide band that is combined from several discontiguous frequency bands or separated into several discontiguous frequency bands.

Figure 1:
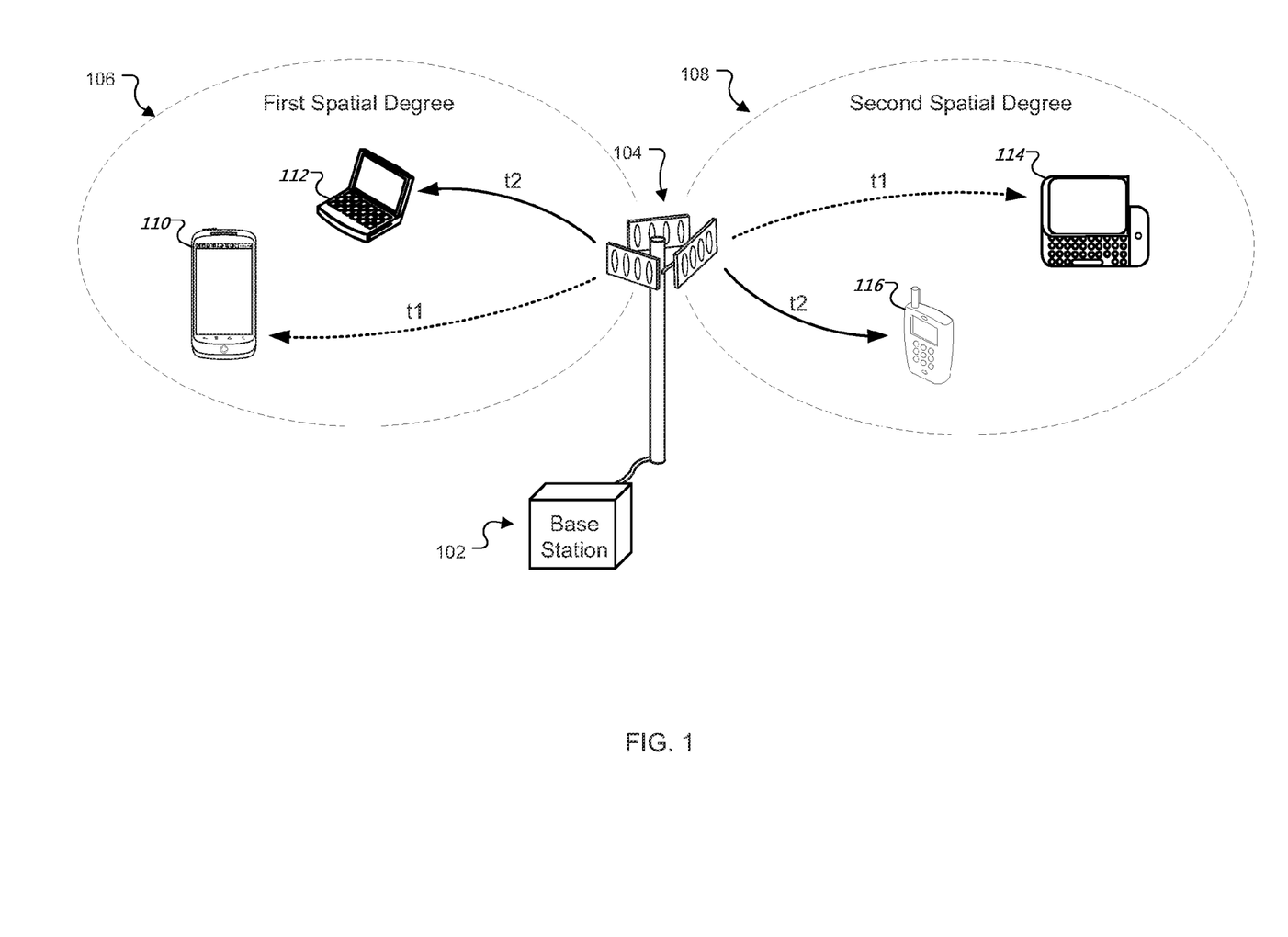
FIG. 1 is an example of a base station that is configured to communicate with multiple mobile computing devices using a multiple-input multiple-output (MIMO) communication system.

FIG. 1 is an example of a base station that is configured to communicate with multiple mobile computing devices using a multiple-input multiple-output (MIMO) communication system. An actual network may include multiple base stations, but a single base station transmitting tower 102 is illustrated in FIG. 1 for purposes of clarity and simplification. In some implementations, the base station 102 includes an array of antennas 104. The radio antennas couple electromagnetic energy from one medium, space, for example, to another, such as wire, coaxial cable, or a waveguide.

In some implementations, the base station communicates with multiple client devices on the same time-frequency resource through spatial separation with the antenna arrays, a practice known as spatial division multiple access (SDMA). In other words, with SDMA an antenna array can form multiple spatial channels to allow several communication links to share the same time-frequency resources. SDMA architecture can enable the channeling of radio signals based on a client device's location. Each spatial channel may include a directional range of the base station's periphery.

As an illustration, mobile computing devices 110 and 112 are in a first spatial degree of freedom 106, and mobile computing devices 114 and 116 are in a second spatial degree of freedom 108. Accordingly, the base station 102 may transmit, at the same time and over the same band of frequencies, separate data streams to the first spatial degree 106 and the second spatial degree 108.

Although two spatial degrees of freedom are illustrated in FIG. 1, the system described in this document may communicate using more than two spatial degrees of freedom, for example, forty spatial degrees of freedom at a given time. In various examples, each of the antennas in antenna array 104 transmits and receives for a particular spatial degree of freedom. In other words, a direction of transmission may be determined by a property of the antenna design itself. In other examples, the antennas work together using beamforming techniques to direct communications to multiple spatial degrees of freedom. Accordingly, the antenna array for base station 102 includes multiple antennas (e.g., 40 antennas).

The benefits of multiplexing users in the spatial domain can include increasing a quantity of devices that can communicate with the base station 102 at a given time, extending the range of communication possible between a client device and a base station, and receiving less destructive effects of multipath signals (e.g., those signals that bounce off buildings).

Additionally, the base station 102 can employ one or more dynamic time division multiple access (TDMA) protocols to communicate with multiple wireless client devices over a single frequency and within a single spatial channel. The TDMA protocol allocates slices of time during which certain of the devices in a spatial channel will transmit and/or receive information, while the other devices wait their turn. Communications within this structure can occur in repeating structures known as frames of information, where each frame may have a defined structure. Frames are, among other things, constructs whose defined structure is understood by both wireless devices and base stations, so that each device knows when it is allowed to communicate and what data should be communicated during a particular time slice. During portions of a frame, a client device may be permitted to transmit, receive, or wait and listen. The general structure and function of frames is well-known.

Transmission time in the network can be divided into uplink and downlink times. In some implementations, the amount of time devoted to uplink and downlink can be equal. In other implementations, time can be split between uplink and downlink times using a relatively arbitrary ratio. For example, two-thirds of time can be allocated for uplink time and one-third of time can be allocated for downlink time.

As an illustration, mobile computing devices 110 and 114 may "listen" for data that is transmitted from the base station 102 during a time period "t1," while mobile computing devices 112 and 116 may listen for data during a time period "t2." Although uplink time slices are not illustrated in FIG. 1, such time slices could be illustrated with arrows traveling from the mobile computing devices to the server system, for example, during time periods "t3" and "t4." Further, although the first and second spatial degrees of freedom each include two devices, multiple additional devices may reside in each geographical degree of freedom and still use the communication system. In some implementations, the combination of SDMA and TDMA allows base station 102 to communicate with approximately 10,000 client devices. Accordingly, during a given period of time, the base station 102 may transmit to or receive from a set of mobile computing devices that are geographically located in different spatial degrees of freedom.

Transmitting over a large amount of bandwidth, for example, up to 168 MHz or more, allows transmitting at a low power at any given frequency because the power may be spread across the larger bandwidth. Accordingly, the system may be designed to be a low signal-to-interference ratio (SIR) system. A low SIR system can be a system where the ratio of the strength of signals received at the base station and at client devices to the strength of undesired signals (noise and interference) is low. Thus, signals will not be transmitted with as much power as in a high SIR system. A low SIR system can reduce interference to neighboring cells. In some implementations, the described system can operate below 0 dbm and may be able to operate down to −15 dbm. In some examples, the described system operates below the noise level in cooperation with DSSS techniques, and the signal is despread by a receiving device using the key specified used in the DSSS spreading operation.

A system designed to be low SIR can be more robust against interference from devices that are not under the network's control. Thus, viewing a specific client device in a MIMO system can be much easier in a low SIR system as the interference from one spatial degree of freedom to another may be reduced. Further, with less potential of interference from other spatial degrees of freedom, the channel estimations may not need to be as accurate. Additionally, a low SIR system may be more robust to interference from devices that are not under the network's control. This benefit may be especially important when using unlicensed spectrum where devices may use the spectrum without exclusivity (e.g., when operating in the unlicensed TV whitespace spectrum).

The base station 102 is configured to communicate with a variety of wireless devices. For example, the base station 102 can communicate with personal computers, laptop computers, cellular phones, personal digital assistants, pagers, video game consoles, and other wireless computing devices such as netbooks. The network can be designed to leverage TCP/IP so that voice, data, etc. is encoded in IP.

In some implementations, a particular client device can be located simultaneously within a geographic coverage area that is served by multiple base stations. In such circumstances, the wireless device is capable of communicating with either base station (or it could communicate with both). In some implementations, the wireless device 112 can elect to associate with the base station that has the strongest signal at the location of the wireless device. In some implementations, the wireless device can elect to associate with the base station that has the best signal-to-noise ratio.

As mentioned previously, the transmission system may be designed as a low SIR system that transmits data to a particular receiving device, in a particular spatial degree of freedom and during a particular period of time, across a wide band of frequencies. The radio spectrum that in a particular geographical region, however, may not have a frequency swath of the desired width that is available for such transmission. As such, the transmission system may be designed to split the transmitted signal among discontiguous frequency bands, so that the transmitted signal does not include a substantial level of power at unavailable frequencies. The operation of such a transmission system is described with reference to FIG. 2, and the operation of an analogous receiving system is described with reference to FIG. 3.

Figure 2:
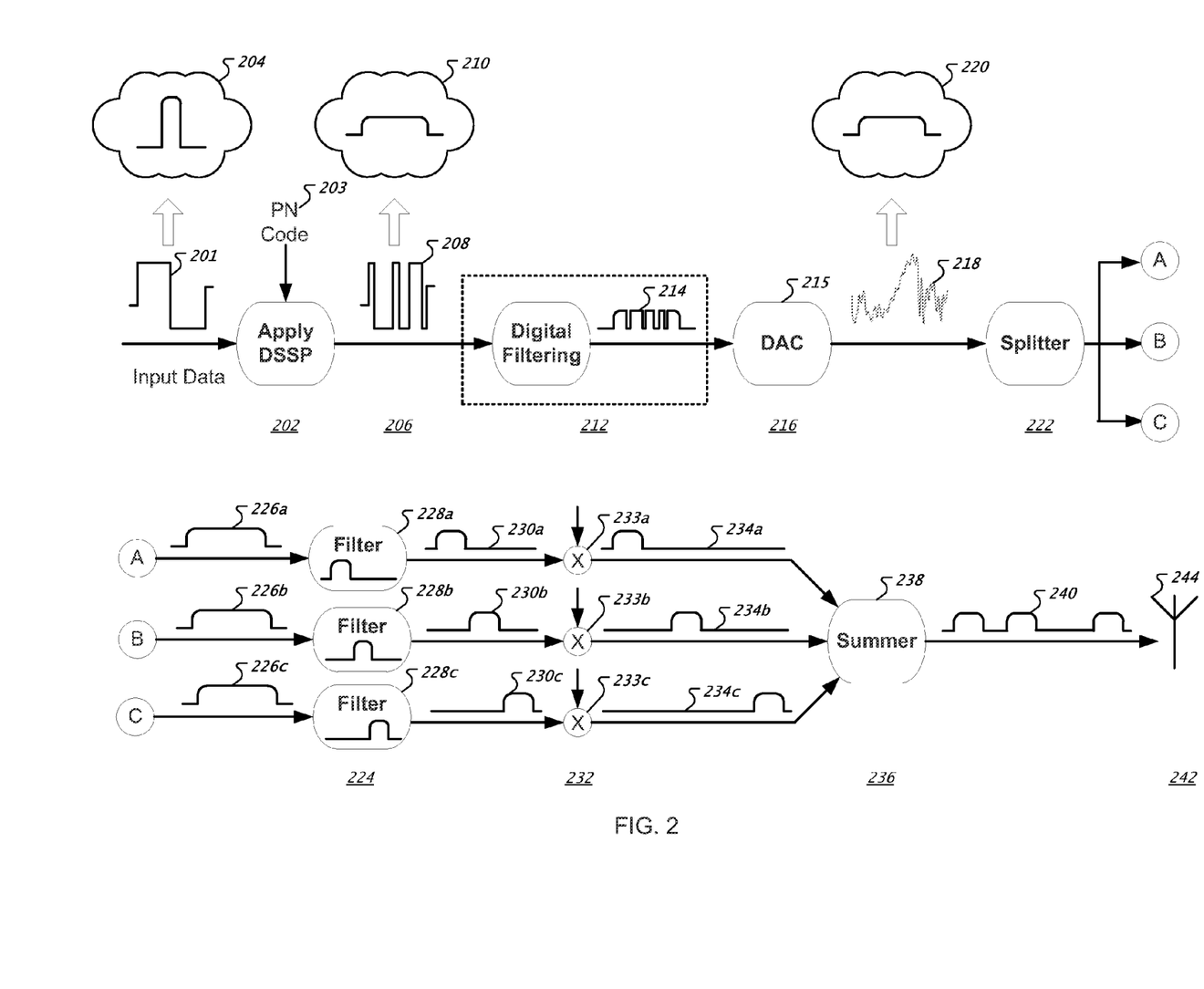
FIG. 2 is an example of wireless transmission of data over discontiguous portions of radio frequency spectrum.

FIG. 2 shows a transmission of data over discontiguous portions of radio frequency spectrum. For purposes of this discussion, the transmission is described as being from a base station to a client mobile device, although such a transmission may just as well be from the client mobile device to the base station, between client mobile devices, or between geographically fixed transmitting devices.

At phase 202, the transmission system of the base station receives data 201 that is designated for wireless transmission to a remote computing device, and applies a spreading operation so that the transmitted signal will transmit over a wider range of frequencies than without application of the spreading operation. The received data may be in digital form and is designated in FIG. 2 with identifier 201, although FIG. 2 also shows a frequency representation 204 of the received data 201, should the received data 201 be modulated with a carrier signal. The received data 201 may include a stream of digital data that is queued for transmission to a single remote computing device of many remote computing devices that are served by the base station. The stream of digital data may include digital content (e.g., web page content, media content, etc.) that was requested by the single remote computing device, along with appropriate packet headers and other data that facilitates wireless transmission of data between devices.

Although the base station may be configured to transmit data to each of a plurality of remote computing devices at a given instance in time (through an SDMA scheme, described previously), the received data may be data that is intended for only one of the plurality of remote computing devices. The base station may also be configured to transmit to multiple computing devices in a given spatial degree of freedom over a length of time, through TDMA.

As discussed previously, transmitting the data 201 over a wider frequency band than the relatively narrow band of frequencies that is illustrated by frequency representation 204 is advantageous. As such, the transmission system encodes the received data 201 across a wider range of frequencies with an energy spreading operation so that when the resulting signal is transmitted, the power level of the transmitted signal over a given frequency slice is lower than the power level of the above-described relatively narrow band of frequencies over a same-sized frequency slice.

The transmission system may perform such an energy spreading operation by combining (e.g., with a modulator) the received data 201, which may be a stream of digital data, with a pseudorandom sequence of data 203 that encodes data at a higher frequency. The result of the combination may be a third digital signal 208 with high frequency encoding of data 201.

The energy spreading operation may be a Direct Sequence Spread Spectrum (DSSS) process. The DSSS process multiplies the data being transmitted by a "noise" signal. The noise signal is a pseudorandom sequence of values at a frequency that is higher than the frequency of the original signal, thereby spreading the energy of the original signal into a wider band and generating a stream of modified data. This "spreading" of the input signal can be decoded by a receiving device, if the receiving device uses the same noise signal in a "dispreading" operation. The noise signal is sometimes referenced as the "key," "code," or "pseudo-random number" (PRN).

In some examples, the stream of digital data 201 may be encoded in an analog signal instead of a digital signal, for example, by modulating a sine wave with the stream of digital data. The resulting analog signal may then be modulated with the pseudorandom sequence of data 203, for example, through a phase shifting modulating technique. Whether the resulting signal is in analog or digital form, the energy level of the signal that results from the spreading operation will be spread over a greater frequency range when transmitted in analog form than without the spreading operation, as illustrated by the frequency domain representation 210 of signal 208.

In some, but not all implementations, (as illustrated by the dashed box in FIG. 2 that represents phase 212), the signal 208 that encodes the received data 210 across the wider band of frequencies is processed by a digital signal processor to reduce the power level of the signal at certain frequencies. Specifically, and as discussed throughout this document, the transmission system may be configured to transmit a wideband signal across discongituous portions of frequency. Some of the frequency content of the wideband signal may be frequency translated to appropriate frequency ranges through the frequency translation process that is described in detail below (e.g., using mixers). Some frequency portions of the wideband signal, however, may be essentially removed or "notched out" from the signal by the digital signal processor. Although portions of the signal 208 at certain frequencies may be removed, the decoding system at the receiving device, may be robust enough to decode the input data signal.

Digital filtering may be beneficial, for example, to perform fine-scale filtering or dynamic filtering rather than static filtering and mixing of large frequency ranges (as discussed in below). As an illustration, suppose that an organization obtained a license to transmit at the frequencies 100-200 MHz, 900-950 MHz, and 960-980 MHz, and was allowed to transmit over any channels that are unoccupied at a given instant in the 600-650 MHz range. The organization may develop a transmission system so that a signal with a bandwidth of approximately 230 MHz is separated into three separate frequency ranges, one from 100-200 MHz, one from 600-650 MHz, and one from 960-980 MHz. This separation could be performed using filters and mixers, as discussed throughout this document.

The digital filtering system can fine tune such results of the analog filtering and frequency translation. For example, the transmission system, either before the separation or after the separation, may use a digital signal processing device to filter out frequency content that is at, or will end up at 950-960 MHz. With regard to the 600-650 MHz range, the transmission system may employ a spectrum sensor to detect which frequency ranges are unavailable within the 600-650 MHz range, and may use the digital signal processing device to filter out frequency content at such unavailable frequency ranges, or that will end up at such unavailable frequency ranges after frequency translation by a mixer, for example. A "notched out" representation of the signal 208, as shown in the frequency domain, is illustrated as signal 214. In some implementations, a single contiguous block of frequencies that is frequency translated as a whole (e.g., as illustrated in FIG. 2 by signal 230a), may include one, two, three, four, or five, "notches" or filtered out portions within the otherwise contiguous band of frequencies.

At phase 216, a digital to analog converter converts the digital signal to an analog signal 218. The resulting analog signal 218 is shown alongside a frequency domain representation 220 of the analog signal 218. The frequency domain representation 220 is shown without any notching that may occur in the digital filtering phase 212, although such notches may be present.

At phase 222, the transmission system splits the signal 218 into multiple signals 226a-c (shown in frequency domain representation, for ease of illustration). Each of the multiple signals 226a-c may be similar to the signal 218, except that the multiple signals 226a-c may be attenuated. The multiple signals 226a-c may be substantially identical to each other. For example, the signal 218 may be split by a power splitter, a passive splitter, or a device such as a diplexer, a triplexer, etc, duplicating signal 218 into multiple signals 226a-c. Each of the multiple signals 226a-c is associated with a particular band of frequencies that is a subset of the band of frequencies that include frequency content in each of the multiple signals 226a-c. The particular frequency band associated with each of the multiple signals 226a-c may be different.

At phase 224, each of the multiple signals are filtered to reduce a power level of frequencies that are not in the particular frequency band that is associated with the respective signal. Stated another way, each of the multiple signals may pass through a filter to isolate the particular frequency band for that respective signal. The isolated portions of signals 230a-c (shown in frequency domain representation), if recombined without the translating operations of phase 232, may substantially represent any of signals 226a-c.

As an illustration, wideband signal 226a is filtered by bandpass filter 228a (which may alternatively be a low pass filter) to generate signal 230a, which includes the low-frequency band portion of signal 226a. Signal 226b is filtered by bandpass filter 228b to generate signal 230b, which includes the mid-frequency band portion of wideband signal 226b. Wideband signal 226c is filtered by bandpass filter 228c (which may alternatively be a high pass filter) to generate signal 230c, which includes the high-frequency band portion of wideband signal 226c. Together, the three signals 230a, 230b, and 230c may represent and include all of the frequency content of any one of signals 226a, 226b, and 226c. In some implementations, a filtering action is incorporated into the splitter 222 instead of implementing the filtering with filters 228a-c.

At phase 232, at least one of the multiple signals 230a-c is frequency translated to a different frequency range. For instance, all of the multiple signals 230a-c may be frequency translated to different frequency ranges by mixers 233a-c, as shown in FIG. 2, to generate signals 234a-c (shown in frequency domain representation). The transmission system may frequency translate the signals 230a-c so that, when the signals are recombined (and upconverted, if the upconversion is not performed in frequency translation phase 232), the segmented portions of frequency content are positioned at frequency ranges over which the organization operating the transmission system is permitted to transmit.

As suggested above, the frequency translation phase 232 may not simply spread the frequency content in the wide band signals 230a-c apart relative to each other, but may also shift each of the signals 230a-c to a higher frequency for transmission (removing the need for a separate upconversion step). For example, each of the mixers 233a-c may frequency translate its respective signal to a higher frequency, but the frequency translation would be by different amounts.

Although FIG. 2 does not depict the local oscillators that are applied to the mixers, selection of local oscillator frequencies would be discernible by a skilled artisan after identifying the frequency ranges over which the transmission system is configured to transmit. Similarly, upon identifying the width of such frequency ranges, a skilled artisan would be able to design filters 228a-c to isolate appropriately-sized frequency ranges from signals 226a-c.

At phase 236, the transmission system combines the filtered and frequency translated wideband signals 234a-c, for example, with a summer 238. The resulting signal 240 (shown in frequency domain representation) would include the frequency content of the original signal 208 separated into discontiguous frequency ranges. The original frequency content from signal 208 may otherwise be represented in signal 240, if the digital filtering phase 212 is not performed, without substantial loss of any portions of the frequency content from signal 208 (e.g., because the receiving system will reconstruct the original data signal 201 from the signal 240).

At phase 242, the transmission system provides the signal 240 for wireless transmission by the antenna 244. If the transmission system (at stage 232) did not previously upconvert each of the signal 230a-c to a higher frequency, the transmission system may employ a separate upconversion stage to upconvert the summed signal 240 prior to wireless transmission.

In some implementations, the digital to analog conversion phase 216 may occur at a different occasion in the signal transmission process. For example, the signal may remain in digital form throughout the splitting process (phase 222), the filtering process (phase 224, and the frequency translation process (phase 232), and the summing process (phase 238), and may be finally converted to analog form before wireless transmission by antenna 242. A digital to analog converter may not be necessary if the input data 201 includes an analog signal that is a result of a modulation of the digital data with an analog signal.

In some implementations, the frequency translation is performed by digital mixers, for example, in a digital signal processing device (the splitting phase 222 and the filtering phase 224 may also be performed by the same or different digital signal processing devices). In some implementations, the frequency translation is performed by a downsampling or upsampling process.

In some implementations, the transmission system includes a spectrum sensor that identifies which portions of a band of frequencies are being utilized by third-party transmitting devices, and as a result the transmission system dynamically adjusts the local oscillators that are applied to the mixers 233a-c and optionally the filters 228a-c so that the frequency content portions in signals 230a-c are appropriately sized and appropriately positioned in the frequency spectrum, so as to transmit over available frequency ranges. In some implementation, the filtering phase 224 may be performed after the translating phase 232. In some implementations, the spectrum sensor is used, not to adjust the filters 228a-c and the mixers 233a-c, but to identify which one or more frequency portions of the signal 208 to remove at the digital filtering phase 212.

FIG. 2 does not depict all features that may be included in the transmission system. For example, one skilled in the art would understand that amplifiers and filters may be employed throughout the phases discussed with reference to FIG. 2 in order to adjust the power level of the signals and reduce aliasing (e.g., as a result of the mixing phase 232) and noise. Further, the transmission system may employ additional phases between the phases depicted in FIG. 2, and the terminology in this disclosure is not meant to exclude such operations. As an example, a statement that the digital to analog converter 215 converts the signal 208 to analog is not meant to exclude the signal 208 being digitally filtered by phase 212, or amplified or filtered by other components that are not shown in FIG. 2. Reference to a signal is meant to include the signal as encoded within another signal, or the signal as changed by an intervening component.

Figure 3:
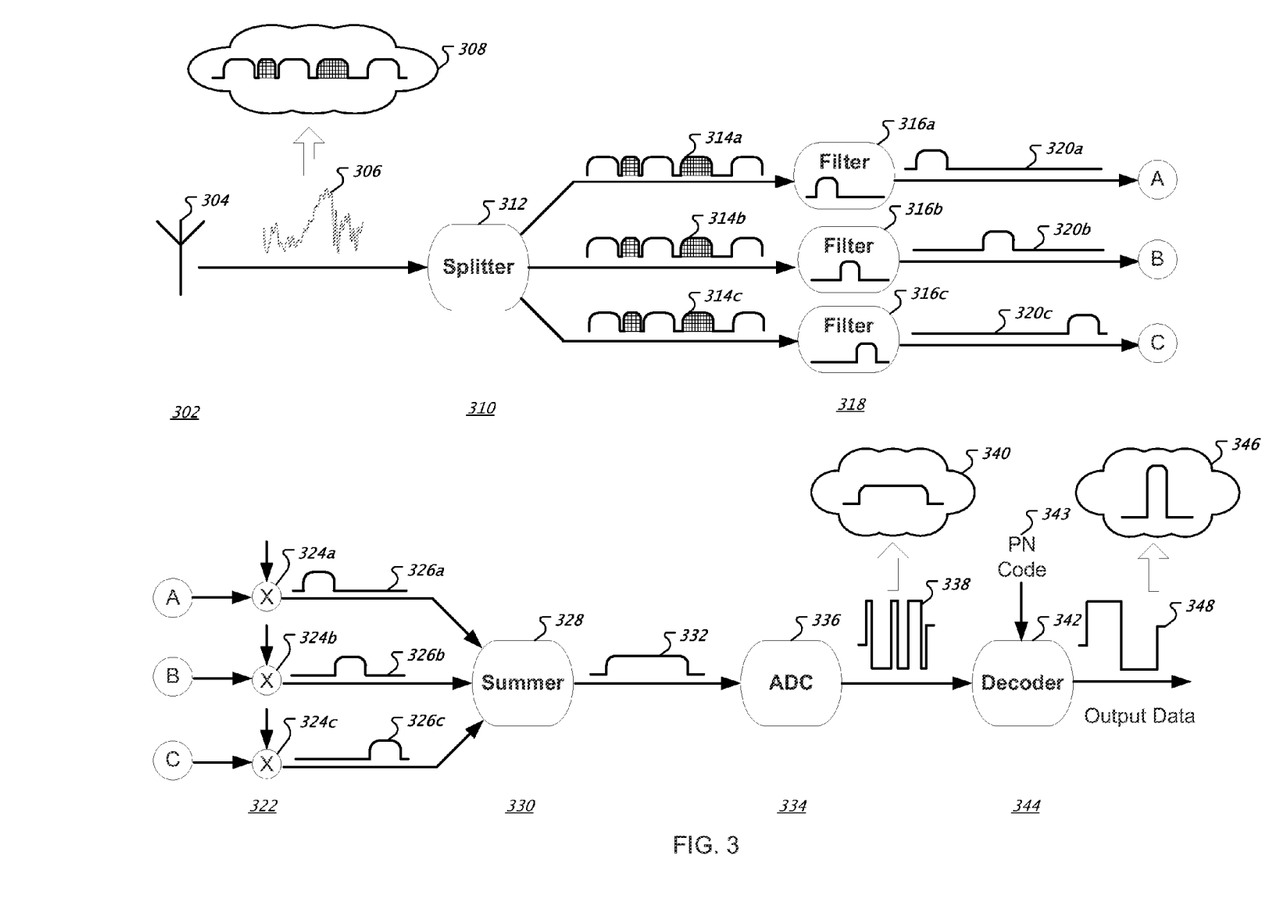
FIG. 3 is an example of wireless reception of data over discontiguous portions of radio frequency spectrum.

FIG. 3 shows a reception of data over discontiguous portions of radio frequency spectrum. For purposes of this discussion, the reception is described as being by a client mobile device of a signal that was transmitted by a base station (e.g., the base station discussed with reference to FIG. 2), although such reception may be by a fixed transmitting device such as a base station. In some examples, the reception of data generally follows an inverse of the operations discussed with reference to FIG. 2, so the discussion of FIG. 2 serves as a basis for the understanding of many of the operations discussed with reference to FIG. 3.

At phase 302, an antenna 304 receives analog signal 306 (also shown alongside a frequency domain representation 308 of the signal 306). The analog signal 306 contains frequency components that were transmitted by the base station described with respect to FIG. 2 (shown without shading in frequency domain representation 308) along with frequency components that were transmitted by one or more third-party devices (shown with shading in frequency domain representation 308).

At phase 310, a splitter 312 of the receiving system splits the received signal 306 into multiple signals 314a-c. The signals 314a-c may be similar to the signal 306, except attenuated in power and possibly with some of the lest and highest frequencies filtered out. Each of the signals 314a-c is associated with a particular range of frequencies, as discussed below.

At phase 318, the receiving system filters each of the signals 314a-c with filters 316a-c. The filtering operation for each of the signals 314a-c removes frequency components of the respective signal that are not associated with the particular range of frequencies for the respective signal. As such, the filtering removes frequency components that were transmitted by third-party devices, and those frequency components that were transmitted by the transmitting device of FIG. 2, but that are associated with other frequency ranges. The resulting signals 320a-c (shown in frequency domain representation) may each include substantial frequency content over a single contiguous range of frequencies. The signal contiguous range of frequencies for each of the signals 320a-c may not overlap each other (e.g., the frequency content may not be located at the same frequencies).

At phase 322, the receiving system translates the frequencies of at least one of the signals 320a-c. For example, FIG. 3 shows the frequencies of each of the signals 320a-c being translated in frequency to generate the signals 326a-c (shown in frequency domain representation). The frequency translation may be the inverse of the frequency translation that is described with respect to phase 232 in FIG. 2. For example, if phase 232 translated the frequency ranges −50 Hz, 120 Hz, and 200 Hz, the phase 322 would translate the frequency ranges 50 Hz, −120 Hz, and −200 Hz. In other words, the signals 320a-c may include content at specific discontiguous frequency ranges, and the frequency translation process at phase 322 brings the frequency ranges together in the frequency domain, so that when the signals are summed, a signal with content over a contiguous block of content results.

At phase 330, the receiving system combines the signals, for example with a summer 328. The resulting signal 332 (shown in frequency domain representation) includes content over a contiguous range of frequencies, and may not include frequency content over discontiguous ranges of frequencies. A power level of the signal 332 across the contiguous range of frequencies may remain low, and may be beneath the noise level, as discussed above.

At phase 334, the receiving system translates the signal from analog to digital, with an analog to digital converter 336, to generate digital signal 338. If signal 338 were modulated with a carrier wave, the frequency domain representation of the modulated signal may appear as shown by the frequency domain representation 340.

At phase 344, the receiving system decodes the signal with a decoder 342. The decoder 342 may perform a de-spreading operation to generate the output data 348, which may be a stream of digital data. The de-spreading operation may use a pseudorandom sequence 343 (e.g., the pseudorandom sequence 203 of FIG. 2) in order to reverse the operations of the spreading operation at phase 202 (FIG. 2). Signal 348, if modulated with a carrier wave, would have a frequency domain representation 346 that illustrates that power of the signal has been concentrated to a narrow band of frequencies.

In some implementations in which content at certain frequency ranges was digitally notched out of the transmitting signal (as shown in FIG. 2 at phase 212), prior to the decoding stage 344 a digital signal processor would notch out the content at the same frequency ranges (e.g., because content by third-party transmitting systems may appear at such frequency ranges).

Although the reception system has been described in FIG. 3 as operating primarily on analog signals, modifications to perform similar processes in the digital domain would be understood by one having ordinary kill in the art. For example, the signal 306 may be translated to a digital signal by the ADC 336, and the splitting phase 310, the filtering phase 318, the frequency translation phase 322, and the summing phase 330 may be performed by one or more digital signal processors. In alternative implementations, some of the phases may be performed while the signal is in analog form, and some while the signal is in digital form.

While this document refers at times to a signal having content at certain frequencies, and not having content at other frequencies, it is understood that there will be some content at the "empty" frequencies, for example, at a significantly diminished level in comparison to the frequency ranges at which content is "located" (e.g., at a power level proportion of 1/10, 1/30, 1/50, 1/100, 1/500, or 1/1000 when the power level is integrated over a 100 Hz, 1 KHz, or 1 MHz range of frequencies at a center of each frequency range).

Also, while FIGS. 2 and 3 illustrate splitting a signal into three corresponding signals and modifying the resulting three signals, it should be understood that similar systems may be designed to split a signal into two, or four or more signals, and modify the resulting signals.

In various examples, the digital signal processing device (DSP) can include one or more devices that perform signal processing in a digital form. Example devices include digital signal processors, field-programmable gate arrays (FPGAs), application specific integrated circuits (ASICs), general purpose processors, etc.

In some examples the process of FIG. 3 may be described as follows. The system receives a first signal with an antenna. The analog signal may have been wirelessly transmitted. The system splits the first signal into multiple signals, each of the multiple signals being associated with a different portion of the band of radio frequencies. The system filters each of the multiple signals to isolate each respective one of the multiple signals to its associated portion of the band of radio frequencies. The system frequency translats at least one of the multiple signals. The system combines each of the multiple signals after each of the multiple signals has been filtered, including the at least one of the multiple signals that has also been frequency translated, to generate a second signal that encodes the data across a single contiguous band of radio frequencies. The system generates a third signal by applying a de-spreading operation to the second signal.

In some implementations, a device includes a transceiver and can both transmit over discontiguous portions of frequency spectrum (as shown in FIG. 2), and can receive over discontiguous portions of frequency spectrum (as shown in FIG. 3). For example, a mobile smartphone may both transmit and receive over the same discontiguous portions of frequency spectrum, as well as the base station with which the mobile smartphone is communicating.

In some implementations, the discontiguous portions of frequency content over which a transmitter transmits includes at least three or at least four discontiguous portions of frequency content separated by at least two or three "gaps" in frequency content, respectively, over which the transmitter does not transmit at a substantial power level.

Figure 4:
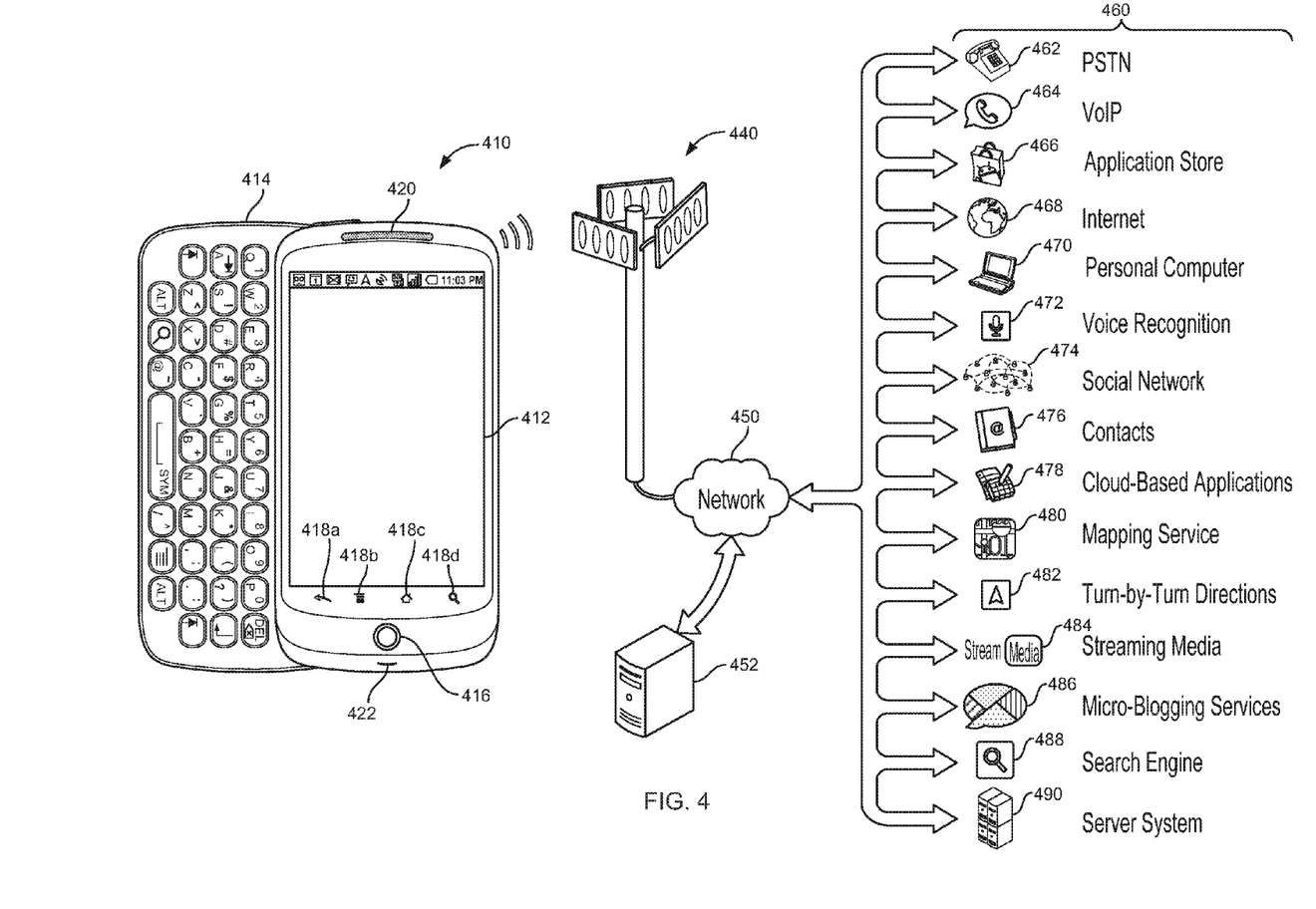
FIG. 4 is a conceptual diagram of a system that may be used to implement the systems and methods described in this document.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-9' and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
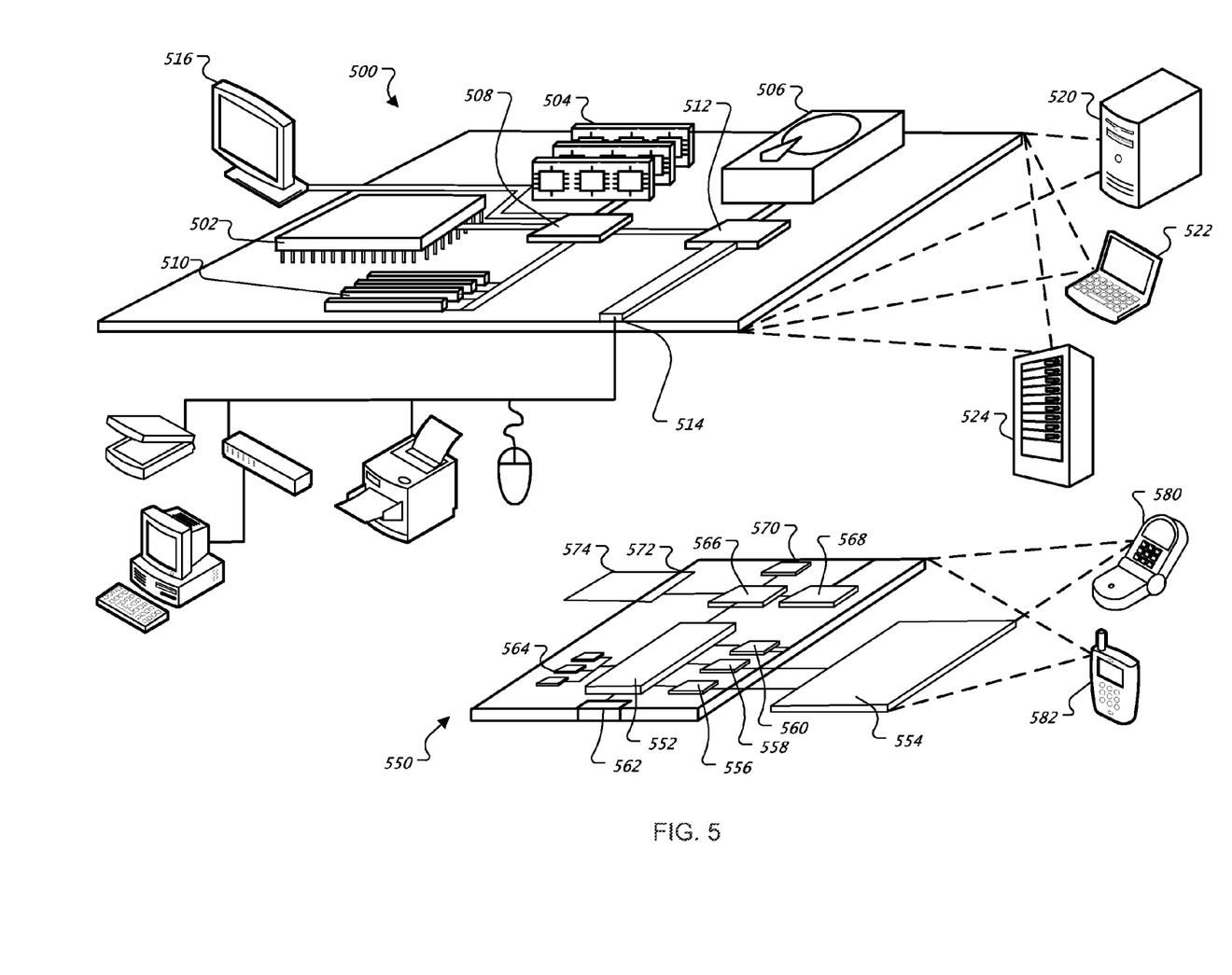
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method for transmitting data over discontiguous portions of radio frequency spectrum, the method comprising:

receiving data that is to be wirelessly transmitted to a remote computing device;
generating a first signal that encodes the data across a band of radio frequencies;
splitting the first signal into multiple signals, each of the multiple signals being associated with a different portion of the band of radio frequencies;
filtering each of the multiple signals to isolate each respective one of the multiple signals to its associated portion of the band of radio frequencies;
digitally filtering at least one of the multiple signals to:
reduce a power level of certain frequencies within the portion of the band of radio frequencies that is associated with the at least one of the multiple signals, and
generate multiple discontiguous portions within the portion of the band of radio frequencies that is associated with the at least one of the multiple signals;
frequency translating the at least one of the multiple signals;
combining each of the multiple signals after the filtering of each of the multiple signals, including the at least one of the multiple signals that has also been frequency translated, to generate a second signal that encodes the data across multiple discontiguous bands of radio frequencies; and
providing the second signal for wireless transmission by an antenna.

2. The method of claim 1, wherein:
the data that is to be wirelessly transmitted to the remote computing device is a stream of digital data; and
generating the first signal includes combining the stream of digital data with a pseudorandom sequence of data that encodes the pseudorandom sequence of data with a highest frequency that is higher than a highest frequency of the stream of digital data.

3. The method of claim 1, wherein generating the first signal includes using direct sequence spread spectrum (DSSS) techniques to encode the first signal across the band of radio frequencies.

4. The method of claim 1, wherein:
the multiple signals includes at least three signals; and
frequency translating the at least one of the multiple signals includes frequency translating each of the multiple signals.

5. The method of claim 1, wherein frequency translating the at least one of the multiple signals includes using a first mixer to frequency translate the at least one of the multiple signals, and a second mixer to frequency translate another one of the multiple signals, and wherein a local oscillator that is applied to the first mixer is different than a local oscillator that is applied to the second mixer.

6. The method of claim 1, wherein frequency translating the at least one of the multiple signals includes translating a frequency of the at least one of the multiple signals a different amount than another of the multiple signals.

7. The method of claim 1, further comprising upconverting the second signal or each of the multiple signals from baseband to a higher frequency range.

8. The method of claim 1, wherein frequency content of the discontiguous bands of radio frequencies in the second signal includes all frequency content of the first signal.

9. The method of claim 1, wherein filtering each of the multiple signals to isolate each respective one of the multiple signals includes reducing a power level of each respective signal at frequencies that do not correspond to the portion of the band of radio frequencies that is associated with each respective one of the multiple signals.

10. A system for transmitting data over discontiguous portions of radio frequency spectrum, the comprising:
- a modulator to (i) receive data that is to be wirelessly transmitted to a remote computing device, and (ii) generate a first signal that encodes the data across a band of radio frequencies;
- a splitter connected to the modulator to split the first signal into multiple signals, each of the multiple signals being associated with a different portion of the band of radio frequencies;
- a filtering system connected to the splitter to filter each of the multiple signals to isolate each respective one of the multiple signals to its associated portion of the band of radio frequencies;
- a digital filtering device arranged to:
  - digitally filter at least one of the multiple signals to reduce a power level of certain frequencies within the portion of the band of radio frequencies that is associated with the at least one of the multiple signals, and
  - generate multiple discontiguous portions within the portion of the band of radio frequencies that is associated with the at least one of the multiple signals;
- one or more frequency translators to frequency translate the at least one of the multiple signals;
- a summer arranged to combine each of the multiple signals after each of the multiple signals has been filtered, including the at least one of the multiple signals that has also been frequency translated, to generate a second signal that encodes the data across multiple discontiguous bands of radio frequencies; and
- an analog transmitter to provide the second signal from the summer for wireless transmission by an antenna.

11. The system of claim 10, wherein:
the data that is to be wirelessly transmitted to the remote computing device is a stream of digital data; and
generating the first signal includes combining the stream of digital data with a pseudorandom sequence of data that encodes the pseudorandom sequence of data with a highest frequency that is higher than a highest frequency of the stream of digital data.

12. The system of claim 10, wherein generating the first signal includes using direct sequence spread spectrum (DSSS) techniques to encode the first signal across the band of radio frequencies.

13. The system of claim 10, wherein:
the multiple signals includes at least three signals; and
frequency translating the at least one of the multiple signals includes frequency translating each of the multiple signals.

14. The system of claim 10, wherein:
frequency translating the at least one of the multiple signals includes using a first mixer to frequency translate the at least one of the multiple signals, and a second mixer to frequency translate another one of the multiple signals, and
a local oscillator that is applied to the first mixer is different than a local oscillator that is applied to the second mixer.

15. The system of claim 10, wherein frequency translating the at least one of the multiple signals includes translating a frequency of the at least one of the multiple signals a different amount than another of the multiple signals.

16. The system of claim 10, wherein the one or more frequency translators upconvert the second signal or each of the multiple signals from baseband to a higher frequency range.

17. The system of claim 10, wherein frequency content of the discontiguous bands of radio frequencies in the second signal includes all frequency content of the first signal.

18. The system of claim 10, wherein filtering each of the multiple signals to isolate each respective one of the multiple signals includes reducing a power level of each respective signal at frequencies that do not correspond to the portion of the band of radio frequencies that is associated with each respective one of the multiple signals.

* * * * *